(12) United States Patent
Lanham et al.

(10) Patent No.: US 8,569,977 B2
(45) Date of Patent: *Oct. 29, 2013

(54) LIGHTING SYSTEM COMBINING NATURAL AND ARTIFICIAL LIGHT

(71) Applicants: Charles E. Lanham, Louisville, KY (US); John N. McCall, Louisville, KY (US); Kenneth R. Carver, Jeffersonville, IN (US)

(72) Inventors: Charles E. Lanham, Louisville, KY (US); John N. McCall, Louisville, KY (US); Kenneth R. Carver, Jeffersonville, IN (US)

(73) Assignee: Nine 24, Inc., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/869,861

(22) Filed: Apr. 24, 2013

(65) Prior Publication Data

US 2013/0234599 A1    Sep. 12, 2013

Related U.S. Application Data

(62) Division of application No. 13/238,047, filed on Sep. 21, 2011, now Pat. No. 8,479,461.

(51) Int. Cl.
*H05B 37/00* (2006.01)

(52) U.S. Cl.
USPC .......................................................... 315/312

(58) Field of Classification Search
USPC .............. 52/173.1, 173.3, 200; 315/291, 308, 315/312, 149, 150, 152, 159
See application file for complete search history.

(56) References Cited

U.S. PATENT DOCUMENTS

| | | | | |
|---|---|---|---|---|
| 6,381,070 | B1 * | 4/2002 | Cheng | 359/591 |
| 8,479,461 | B2 * | 7/2013 | Lanham et al. | 52/200 |
| 2010/0039799 | A1 * | 2/2010 | Levens | 362/147 |

* cited by examiner

*Primary Examiner* — Minh D A
(74) *Attorney, Agent, or Firm* — Stoll Keenon Ogden PLLC; Rebecca Ann Krefft

(57) ABSTRACT

A system for lighting an interior of a building according to one example embodiment includes a curb positioned on an exterior of the building for receiving natural light. A light duct is positioned within the curb having a reflective inner surface for transferring the natural light. A light fixture is connected to an outlet of the light duct such that both natural light and artificial light are emitted from the light fixture to the building interior. A photo sensor is positioned in the building interior to sense an illumination level therein. A controller in communication with the photo sensor and the light fixture is programmed to adjust the amount of light emitted by a dimmable light source in the light fixture in response to fluctuation in the illumination level sensed in the building interior in order to maintain a desired illumination level.

14 Claims, 11 Drawing Sheets

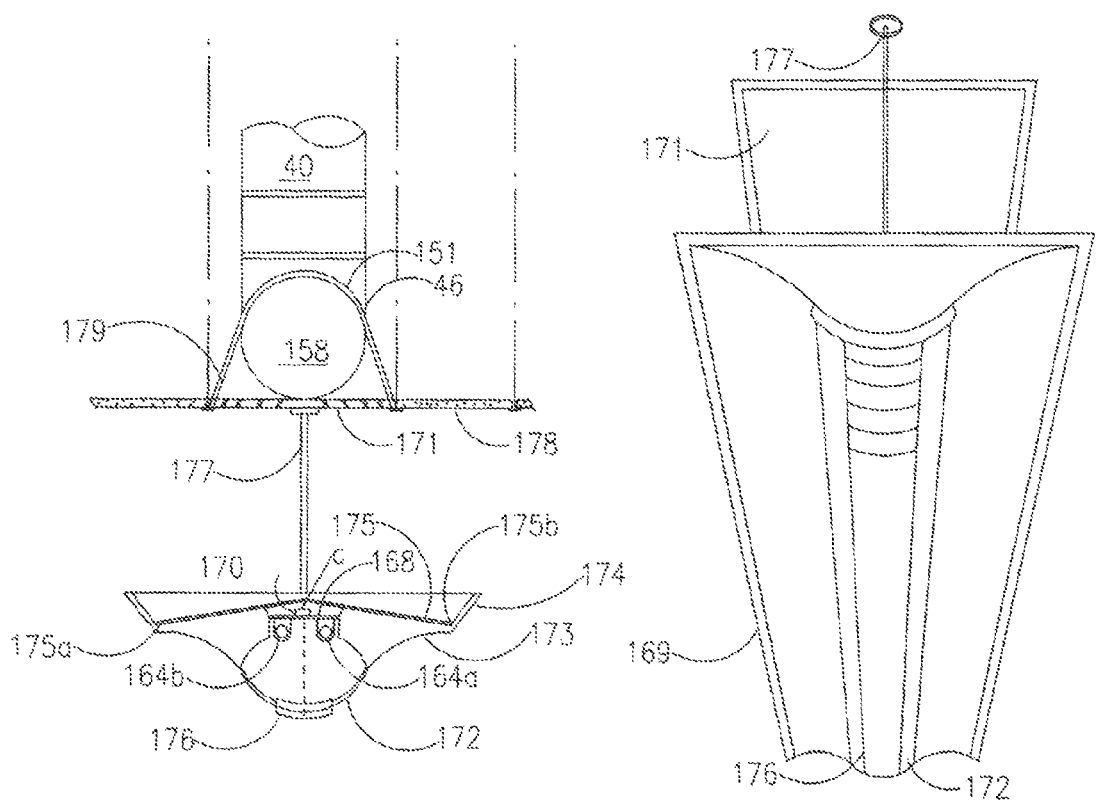

LIGHTING SYSTEM COMBINING NATURAL AND ARTIFICIAL LIGHT

CROSS REFERENCES TO RELATED APPLICATIONS

This application claims priority as a divisional application of U.S. patent application Ser. No. 13/238,047, entitled "Lighting System Combining Natural and Artificial Light" and filed on Sep. 21, 2011, which is incorporated by reference herein in its entirety.

BACKGROUND

1. Field of the Disclosure

The present invention relates generally to a lighting system and more particularly to a lighting system that combines both natural and artificial light.

2. Description of the Related Art

Natural light is often desired by homeowners, businesses and schools for the many benefits it provides. Natural light offers many health benefits in comparison with artificial light. For example, natural light may reduce eyestrain versus artificial light. Energy savings may also be realized by optimizing the amount of natural light presented in an interior portion of a building, a process known as "daylight harvesting." Where more natural light is provided, less artificial light is required thereby reducing electricity consumption during the day.

However, many buildings include rooms or areas that are lit solely by artificial lights such as incandescent lamps, fluorescent lamps or light emitting diodes ("LEDs"). Often times, uniform illumination is not achieved in these areas. Some areas may be too bright, while others are too dim. It is also common for artificial lights to create other undesired conditions such as an unintended glare or excessive ceiling brightness. These non-uniformities are particularly troublesome in areas such as classrooms and workplaces where reading and typing are frequently performed for long periods of time.

Natural light is typically introduced to these areas through windows and/or ceiling skylights. Natural light has also been introduced via one or more light ducts that transfer natural light to an interior room of a building. One known system includes a motorized damper to either open or close the duct depending on whether the natural light is desired. However, non-uniformities may persist even where natural light is provided in a room. For example, the light level may be too high for a student or worker seated near a window or other natural light output while the light level may be too low for another student or worker seated away from the natural light output. Accordingly, it will be appreciated that a lighting system that combines natural and artificial light to achieve a desired illumination level and distribution is desired.

SUMMARY

A system for lighting an interior of a building according to one example embodiment includes a curb positioned on an exterior of the building for receiving natural light. A plurality of light ducts is positioned within the curb. Each light duct has an inlet for receiving the natural light entering the curb and a reflective inner surface for transferring the natural light. A plurality of light fixtures for illuminating a portion of the building interior are provided. Each light fixture is connected to an outlet of at least one of the plurality of light ducts and has a lighting mount for operatively connecting a dimmable artificial light source thereto such that both natural light and artificial light are emitted from each light fixture to the portion of the building interior. A photo sensor is positioned in the portion of the building interior being illuminated by the light fixtures for sensing an illumination level in the portion of the building interior being illuminated. A controller in communication with the photo sensor and the light fixtures is programmed to adjust the amount of light emitted by each artificial light source in response to fluctuation in the illumination level sensed in the portion of the building interior being illuminated resulting from changes in the natural light in order to maintain a desired illumination level in the portion of the building interior being illuminated.

A system for lighting an interior of a building according to a second example embodiment includes at least one light duct having an inlet for receiving natural light and a reflective inner surface for transferring the natural light. Polarized glass is positioned in the path of the light duct. A voltage source is connected to the polarized glass. The opacity of the polarized glass changes as the voltage supplied to the polarized glass by the voltage source changes to dim the natural light passed through the light duct. A light fixture is provided for illuminating a portion of the building interior. The light fixture is connected to an outlet of the at least one light duct and has a lighting mount for operatively connecting at least one dimmable artificial light source thereto such that both natural light and artificial light are emitted from the light fixture to the portion of the building interior. A photo sensor is positioned in the portion of the building interior being illuminated by the light fixture for sensing an illumination level in the portion of the building interior being illuminated. A controller in communication with the photo sensor, the light fixture and the voltage source is programmed to adjust at least one of: (1) the amount of light emitted by the at least one artificial light source and (2) the opacity of the polarized glass in response to fluctuation in the illumination level sensed in the portion of the building interior being illuminated in order to maintain a desired illumination level in the portion of the building interior being illuminated.

A light fixture for emitting artificial and natural light according to one example embodiment includes a lighting mount having a dimming ballast for operatively connecting at least one dimmable artificial light source to the light fixture. An inlet is positioned at a first end of the light fixture and sized to connect to a light duct to receive natural light from the light duct. An outlet is positioned at a bottom portion of the light fixture to emit artificial light from the at least one dimmable light source and the natural light received from the light duct. The light fixture includes a top portion having a sloped height that reduces from the first end of the light fixture to a second end of the light fixture opposite the first end to reflect the natural light in a manner that evenly distributes the natural light from the outlet.

A system for lighting an interior of a building according to another example embodiment includes a light duct having an inlet for receiving natural light and a reflective inner surface for transferring the natural light. A light fixture is provided for illuminating a portion of the building interior. The light fixture has a reflective top surface and a lighting mount having a dimming ballast for operatively connecting at least one dimmable artificial light source to the light fixture. The light fixture is positioned to receive natural light emitted from an outlet of the light duct on the reflective top surface thereof. The reflective top surface is configured to reflect the natural light received from the light duct to another surface to provide indirect natural light illumination to the building interior.

A system for lighting an interior of a building according to another example embodiment includes a curb positioned on an exterior of the building for receiving natural light. At least one light duct is positioned within the curb and extends into the building interior. The at least one light duct has an inlet for receiving the natural light entering the curb and a reflective inner surface for transferring the natural light. A light fixture is provided for illuminating a portion of the building interior. The light fixture is connected to an outlet of the at least one light duct for receiving natural light from the light duct. The light fixture has a lighting mount for operatively connecting a dimmable artificial light source thereto such that both natural light and artificial light are emitted from the light fixture to the portion of the building interior. A system is included for capturing and transferring heat collected by the curb from the natural light out of the curb.

BRIEF DESCRIPTION OF THE DRAWINGS

The above-mentioned and other features and advantages of the various embodiments, and the manner of attaining them, will become more apparent and will be better understood by reference to the accompanying drawings.

FIG. 10 is a perspective view of a light fixture according to one example embodiment.

FIG. 11 is a side cross sectional view of the light fixture illustrated in FIG. 10.

DETAILED DESCRIPTION

Figure 1:
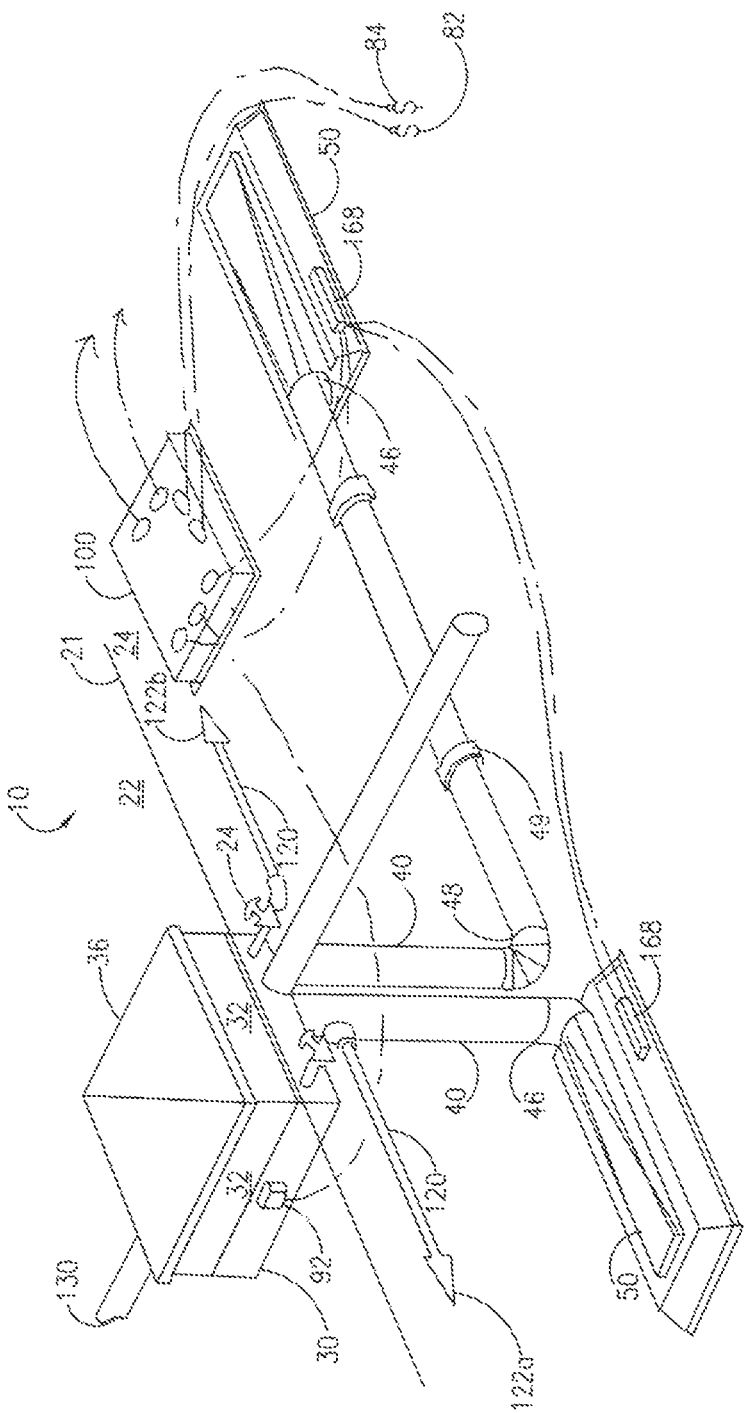
FIG. 1 is a schematic view of a lighting system that combines natural and artificial light according to one example embodiment.

The following description and drawings illustrate embodiments sufficiently to enable those skilled in the art to practice the present invention. It is to be understood that the disclosure is not limited to the details of construction and the arrangement of components set forth in the following description or illustrated in the drawings. The invention is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense and the scope of the present invention is defined by the appended claims.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Figure 2:
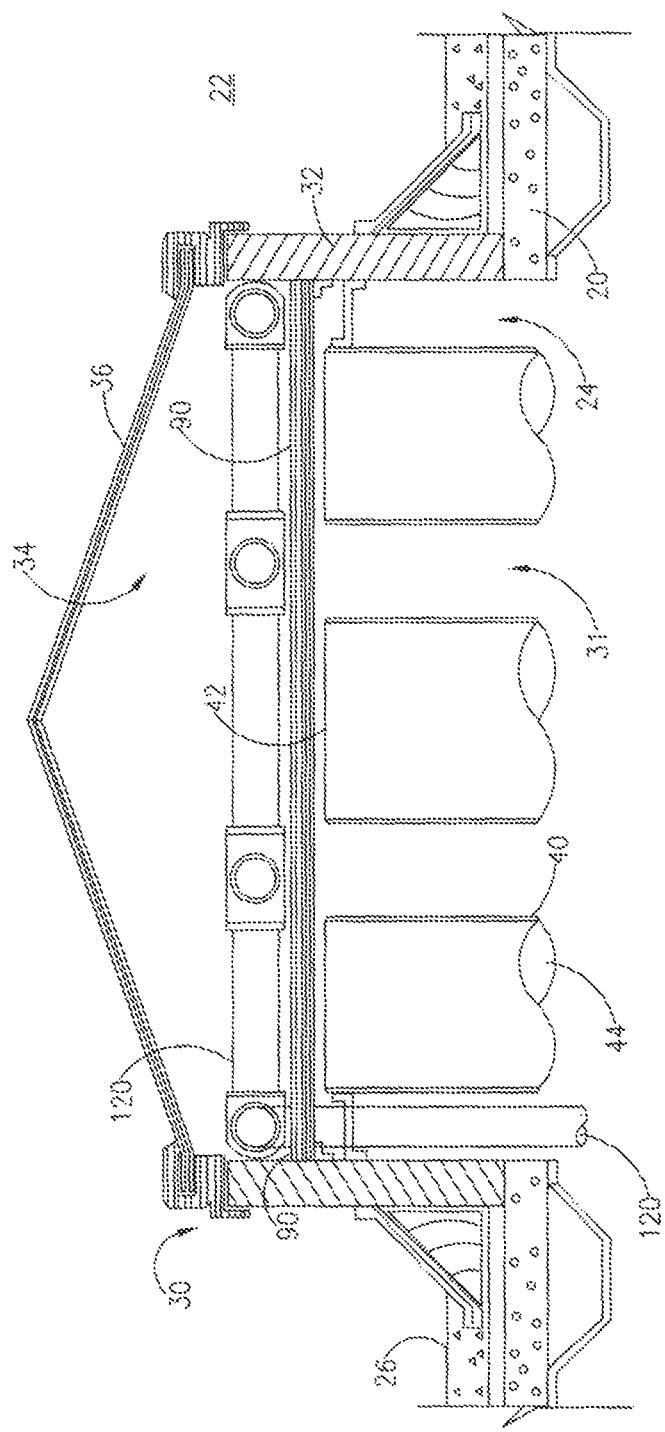
FIG. 2 is a side section view of a curb having a plurality of light ducts installed on the roof of a building for receiving and transferring natural light according to one example embodiment.

FIG. 1 shows a schematic illustration of a lighting system 10 according to one embodiment. Lighting system 10 includes a curb 30 positioned on an exterior portion 22 of a building 20 (FIG. 2). A portion of curb 30 extends from exterior portion 22 into an interior portion 24 of building 20. Dashed line 21 in FIG. 1 schematically illustrates the dividing line between exterior portion 22 and interior portion 24 of building 20. Building 20 may be any suitable building including, but not limited to, a residential home or apartment building, a school, or a commercial building such as an office building, a warehouse or a manufacturing facility.

With reference to FIG. 2, curb 30 is formed by a plurality of walls 32. Curb 30 includes an open portion 34 formed therein that receives natural light from the sun. A skylight cover 36 is preferably positioned over open portion 34 to prevent rain and debris from entering interior portion 24 of building 20 through open portion 34. In the example embodiment shown in FIG. 2, curb 30 extends through the roof 26 of building 20. However, curb 30 may be positioned on any exterior portion of building 20 including an exterior wall thereof. Preferably, curb 30 is positioned on a portion of building 20 that receives consistent sunlight and is clear of trees, buildings and other impediments to sunlight. It will be appreciated that curb 30 collects not only natural light but a significant amount of heat from the natural light as well. Accordingly, in one embodiment, curb 30 is insulated in interior portion 24 of building 20 in order to reduce the transfer of heat collected by curb 30 to the interior 24 of building 20. With reference back to FIG. 1, in the example embodiment illustrated, curb 30 is square shaped; however, any suitable shape may be used including a rectangular or hexagonal curb 30, a circular or oval curb 30 or an irregular shaped curb 30. In one specific example embodiment, walls 32 form a square curb 30 that is 46" by 46" wide and 36" tall. Walls 32 may be constructed of any sturdy, rigid, insulated material such as, for example aluminum or galvanized steel.

In one embodiment, skylight cover 36 is prism shaped as shown in FIG. 2 and directs the sunlight downward into curb 30. Alternatives include those wherein skylight cover 36 is domed or flat. Skylight cover 36 is substantially transparent or substantially translucent to permit natural light to pass therethrough. For example, in one embodiment, skylight cover 36 is composed of ⅜" thick prismatic borosilicate glass that is 98% translucent. Additional suitable materials include, for example, acrylic, glass and polycarbonate plastic.

Figure 3:
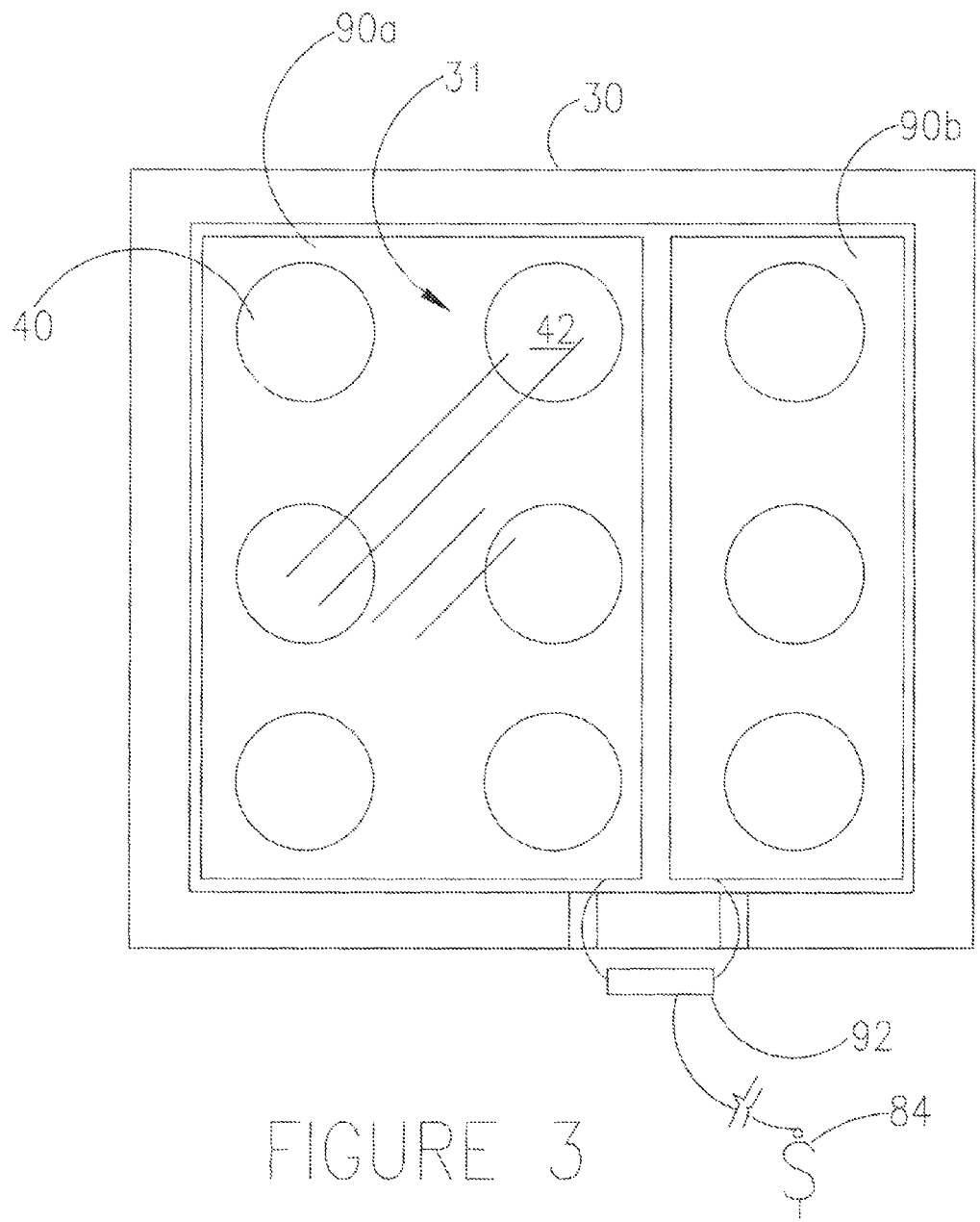
FIG. 3 is a top plan view of a curb having light ducts arranged therein according to one example embodiment.

With reference to FIGS. 1-3, a plurality of light ducts 40 are positioned within curb 30. Each light duct 40 includes an inlet 42 positioned in curb 30 that receives natural light entering curb 30. Light ducts 40 have a reflective inner surface 44 for transferring the natural light therethrough. In one embodiment, light ducts 40 are lined with 98% reflective specular aluminum; however, inner surface 44 may be composed of any suitable material having the desired level of reflectivity. It is preferred that the inlets 42 of light ducts 40 are positioned as close to flush with the top surface of curb 30 as possible in order to maximize the amount of light captured by light ducts 40. However, in one embodiment, inlets 42 are recessed below the top surface of curb 30. In this embodiment, the inner surface of curb 30 above inlets 42 is reflective in order to increase the amount of light captured by light ducts 40. In the example embodiment illustrated, light ducts 40 are tubular and have a circular cross section. In this embodiment, light ducts 40 are joined by elbows 48 and connectors 49 that allow the light duct 40 to change directions and reach its destination. In one specific example embodiment, each light duct 40 has an 8" diameter. Alternatively, light ducts 40 may have any suitable cross sectional shape or size such as an oval, rectangular or square cross section; however, it will be appreciated that a circular cross section provides optimum light transfer. In one embodiment, an interior portion 31 of curb 30 surrounding light ducts 40 is insulated in order to prevent cool air from interior portion 24 of building 20 from causing condensation on light ducts 40 and/or cover 36.

With reference to FIG. 3, in the example embodiment illustrated, a total of nine light ducts 40 are positioned in a 3×3 arrangement in curb 30. More or fewer light ducts 40 may be provided. For example, in another embodiment sixteen light ducts 40 are used in a 4×4 arrangement. Light ducts 40 may be arranged symmetrically or asymmetrically in curb 30 as desired. It will be appreciated that the number of light ducts 40 and the size of light ducts 40 and curb 30 may be selected based on the amount of natural light desired.

With reference back to FIG. 1, an output 46 of each light duct 40 connects to a light fixture 50. Each light fixture 50 is positioned as desired to illuminate a portion of interior 24 of building 20. The natural light from light duct 40 exits output 46 and is emitted into interior 24 from light fixture 50. Each light fixture 50 may be connected to one or more than one output 46 of a light pipe 40 depending on the amount of natural light desired for a given light fixture 50. In one embodiment, light fixture 50 is a 2' by 4' lay-in fixture or a 2' by 2' round or square fixture.

Figures 4, 5:
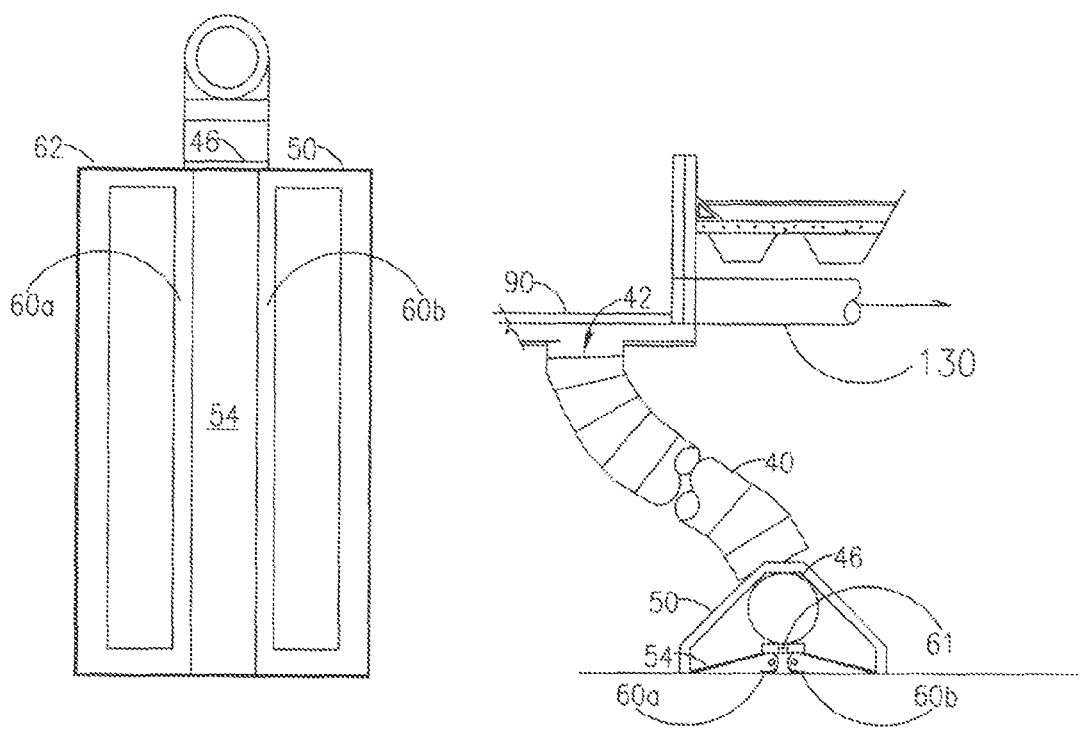
FIG. 4 is a side elevation view of a light duct providing a section view through a light fixture connected thereto according to one example embodiment.
FIG. 5 is a top plan view of a light fixture that emits both natural and artificial light according to one example embodiment.

With reference to FIG. 4, light fixture 50 also includes at least one dimmable artificial light source 60 such as, for example one or more incandescent and/or fluorescent lamps or one or more LEDs operatively connected thereto. In this manner, both natural and artificial light are emitted from each light fixture 50. Artificial light source 60 may be dimmed by altering amount of light emitted by each lamp using a dimming ballast 61 or, where more than one lamp is used, by changing the number of lamps that are illuminated. It will be appreciated that altering the amount of light emitted by each lamp allows for dimming along a substantially continuous illumination range while changing the number of lamps that are illuminated only permits dimming in fixed increments. Accordingly, the former is preferred. One example light source suitable for use with lighting system 10 is an RT5™ fluorescent fixture sold by Lithonia Lighting®, which is an Acuity Brands® company.

A top view of an example light fixture 50 is illustrated in FIG. 5. In the example embodiment illustrated, two artificial light sources 60a, 60b in the form of dimmable fluorescent lamps run longitudinally along light fixture 50. Output 46 of light duct 40 transmits natural light to light fixture 50 that is emitted from the output 62 of light fixture 50. As a result, both artificial light and natural light are emitted from light fixture 50, artificial light from artificial light sources 60a, 60b and natural light received from light duct 40. It will be appreciated that light fixture 50 may provide direct or indirect light as desired depending the orientation and placement of the light fixture 50. A cover 54 composed of a diffuser formed from prismatic acrylic, glass, frosted glass, etc. may optionally be positioned across the output face 62 of light fixture 50 to distribute the light emitted from light fixture 50 and hide the internal light source arrangement. This preserves the aesthetic appearance of light fixture 50 so that light fixture 50 appears as a conventional light fixture.

With reference to FIGS. 6-9, a light fixture 150 is shown according to one example embodiment. Light fixture 150 includes a top portion 151, a bottom portion 152, a first end 153, a second end 154 and two side portions 155, 156. End 153 includes an inlet 158 therein that is sized and shaped to receive outlet 46 of light duct 40. Natural light transferred through light duct 40 exits outlet 46 and enters light fixture 150 through inlet 158. In the example embodiment illustrated, inlet 158 has a circular cross section in order to receive the example light duct 40 illustrated in FIGS. 1-3. An outlet 160 of light fixture 150 is formed in bottom portion 152 as a rectangular opening. Outlet 160 extends substantially across the entire length L and width W of bottom portion 152.

Figure 6:
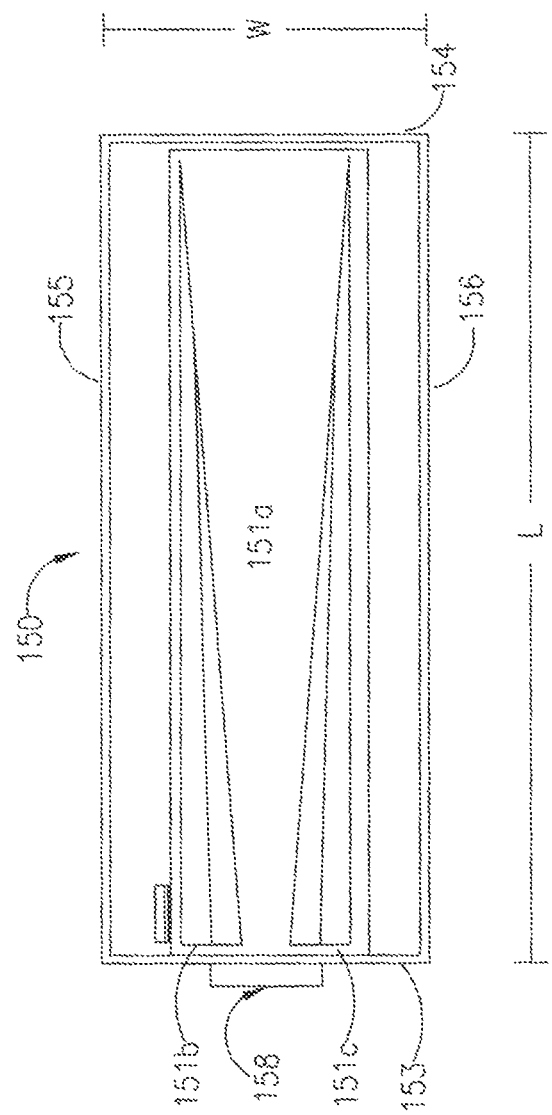
FIG. 6 is a top plan view of a light fixture according to one example embodiment.
Figures 8, 9:
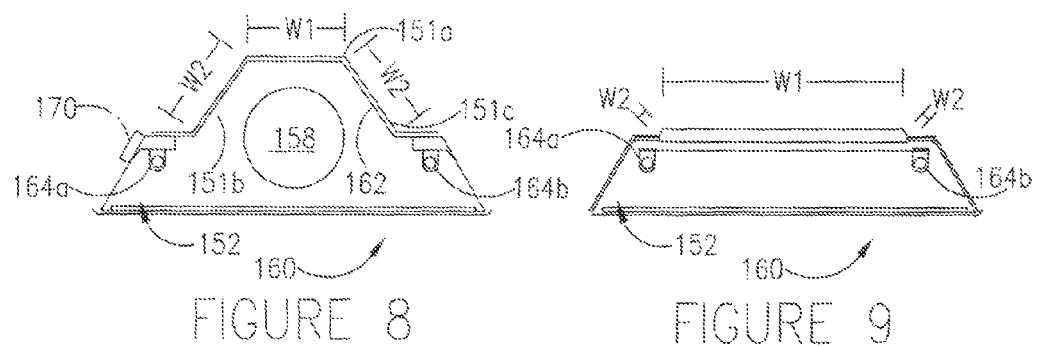
FIG. 8 is a first cross sectional view of the light fixture in FIG. 7 taken along line 8-8.
FIG. 9 is a second cross sectional view of the light fixture in FIG. 7 taken along line 9-9.
Figure 7:
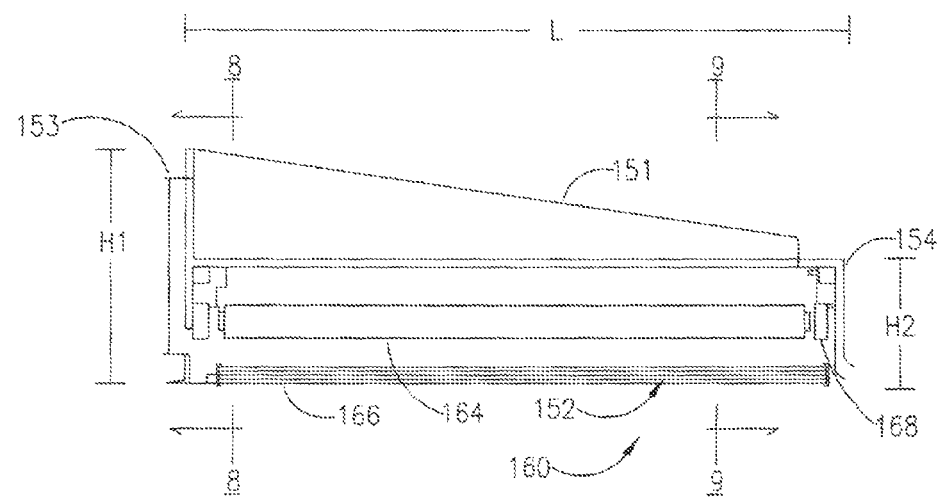
FIG. 7 is a side elevation view of the light fixture illustrated in FIG. 6.

Top portion 151 of light fixture includes a sloped height that reduces from a first height H1 at end 153 having inlet 158 to a second height H2 at end 154 opposite thereto. The inner surface 162 of top portion is reflective in order to reflect the natural light from inlet 158 downward out of outlet 160. It will be appreciated that the use of a sloped top portion 151 provides a substantially even distribution of the natural light from outlet 160 along the length L of bottom portion 152. In the example embodiment illustrated, top portion 151 includes a multi-faceted surface having a planar center facet 151a that slopes from height H1 near end 153 to height H2 near end 154. The width W1 of center facet 151 a increases symmetrically along length L from end 153 to end 154. Planar side facets 151b, 151c are positioned on opposite sides of center facet 151a. As shown in FIG. 8, side facets 151b, 151c are angled with respect to bottom portion 152. Each side facet 151b, 151c has a width W2 that decreases symmetrically along length L from end 153 to end 154 as shown in FIGS. 6, 8 and 9. Facets 151a, 151b, 151c permit a substantially even distribution of the natural light from outlet 160 along the width W of bottom portion 152. In one alternative embodiment, top portion 151 includes a curved, concave top inner surface 162 instead of the multi-faceted configuration shown to create a substantially even distribution of the natural light from outlet 160 along the width W of bottom portion 152.

Light fixture 150 includes at least one artificial light source, such as fluorescent lamp(s) or LED(s), operatively connected to a corresponding dimming ballast or LED driver therein. In the example embodiment illustrated, a pair of dimmable fluorescent lamps 164a, 164b extends longitudinally along length L of light fixture 150. As a result, in this configuration, both natural light and artificial light are emitted in a relatively even distribution from outlet 160 of light fixture 150. Each lamp 164a, 164b is mounted in a lighting mount 168 and operatively connected to a corresponding dimming ballast 170. In one example embodiment, between 0 and 10 volts are provided to the ballasts 170. As discussed above, a cover 166 composed of a diffuser formed from prismatic acrylic, glass, frosted glass, etc. may optionally be positioned across the face of output 160 of light fixture 150 to distribute the light emitted from output 160 and to preserve the aesthetic appearance of light fixture 150.

With reference to FIGS. 10 and 11, a light fixture 169 that provides indirect natural light and direct artificial light is shown according to one example embodiment. Light fixture 169 is suspended from a ceiling 178 by a cable or hanging stem 177. As shown in FIG. 11, light duct 40 feeds natural light from its outlet 46 to inlet 158 of light fixture 150 discussed above in conjunction with FIGS. 6-9 except that in the example embodiment shown in FIGS. 10 and 11, light fixture 150 may be provided without light source(s) 164 therein. Rather, light fixture 150 is used to provide an even distribution of natural light from outlet 160. Outlet 160 is positioned above a louvered opening 171 in ceiling 178. Light fixture 169 is in turn positioned below louvered opening 171 such that louvered opening 171 extends longitudinally along light fixture 169. In one embodiment, louvered opening 171 is 46" long and 12" wide. Natural light from light duct 40 is emitted from louvered opening 171 onto a reflective top surface 175 of light fixture 169. In one embodiment, top surface 175 includes a specular hammer tone natural light finish. The natural light is reflected from reflective top surface 175 onto ceiling 178 and from ceiling 178 to the room or area where light fixture 169 is installed. Reflective top surface 175 is angled with respect to ceiling 178 to reflect the natural light received from light duct 40 away from a centerline C of light fixture 169 toward ceiling 178 to maximize the amount of light reflected from ceiling 178 into the room or area in which light fixture 169 is installed instead of back onto top surface 175. In this manner, light fixture 169 is able to provide indirect natural light to interior 24 of building 20. A flash shield 174, such as a specular aluminum flash shield or a luminous acrylic diffuser, is shown extending from each longitudinal edge 175a, 175b of top surface 175 and forming an obtuse angle with top surface 175. Flash shield 174 acts as a visor to shield observers from the relatively bright, focused reflection on top surface 175. It will be appreciated that the amount of natural light emitted depends, in part, on the size of opening 171 and the size of light duct 40. In one embodiment, ceiling 178 is 70% reflective in order to promote the reflection of natural light off of its surface. It will be appreciated that although light fixture 169 is shown mounted on ceiling 178, light fixture may be mounted on any suitable surface including a vertical wall.

Light fixture 169 includes at least one artificial light source, such as fluorescent lamp(s) or LED(s), operatively connected to a corresponding dimming ballast or LED driver therein. In the example embodiment illustrated, a pair of dimmable fluorescent lamps 164a, 164b extends longitudinally along the length of light fixture 169. In this configuration, artificial light is emitted from light fixture 169 directly to the room or area in which light fixture 169 is installed. Each lamp 164a, 164b is mounted in a lighting mount 168 and operatively connected to a corresponding dimming ballast 170. A cover may be positioned across the face of light fixture 169 over fluorescent lamps 164a, 164b as desired. In the example embodiment illustrated, a shielding louver 176, such as an acrylic shielding louver, extends longitudinally along a center portion of light fixture 169 and a diffuser 172, such as an acrylic diffuser, extends longitudinally along light fixture 169 adjacent to fluorescent lamps 164a, 164b on each side of shielding louver 176. In this configuration, shielding louver 176 and diffusers 172 combine to form a cover over lamps 164a, 164b. An artificial light reflector 173 is also shown extending longitudinally along light fixture 169 on each side of the cover. Light reflector 173 aids in directing the artificial light emitted by lamps 164a, 164b toward the room or area in which light fixture 169 is installed.

Figure 12:
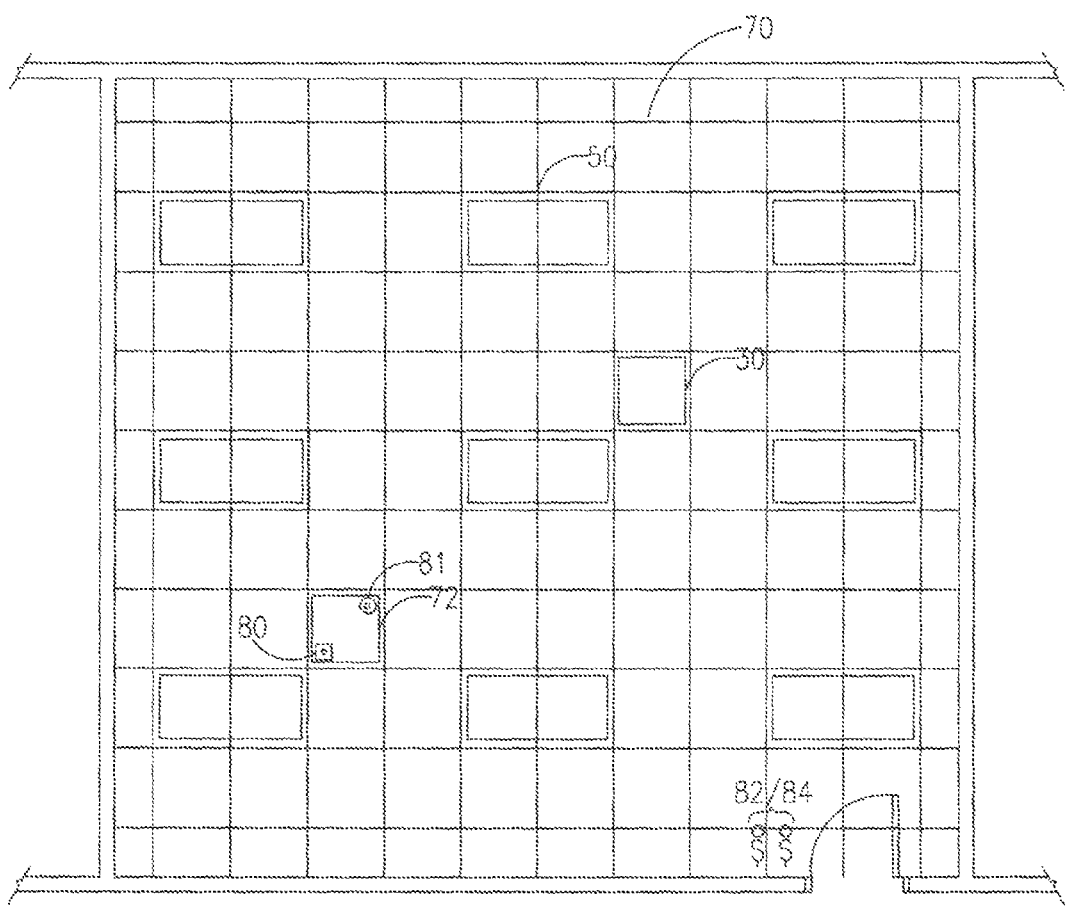
FIG. 12 is a schematic view of a room employing the light system according to one example embodiment.
Figure 13:
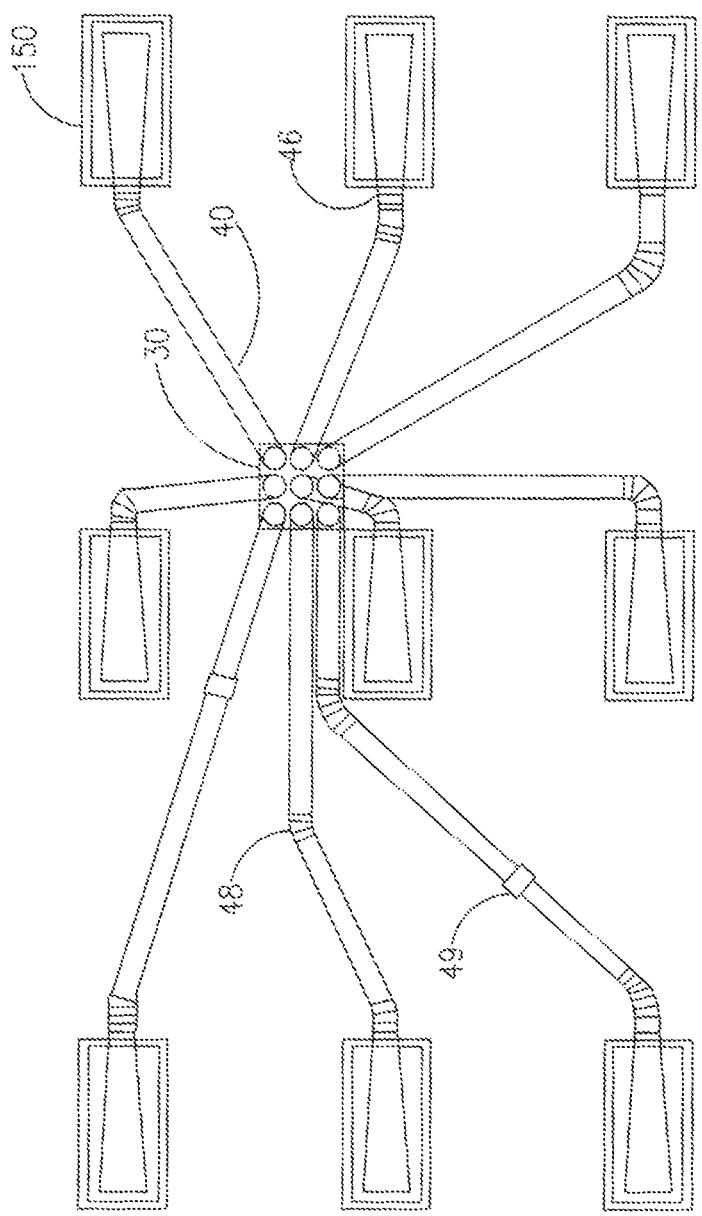
FIG. 13 is a top plan view of the curb, light ducts and light fixtures for the configuration shown in FIG. 12 according to one example embodiment.

FIGS. 12 and 13 schematically illustrate an example configuration of lighting system 10 in a room 70 such as a classroom or an office. The position of curb 30 on the roof of building 20 above room 70 is illustrated in dashed lines in FIG. 12. In this example, nine light ducts 40 are positioned in curb 30, each connected to a corresponding light fixture 50 such as light fixture 150. The nine light fixtures 50 are spaced symmetrically along the ceiling of room 70 to provide both natural and artificial light to room 70. At least one photo sensor 80 is positioned in room 70 that senses the illumination level in room 70. Photo sensor 80 is in communication with a programmable controller 82. This communication may be established via a wired or wireless connection as is known in the art. Controller 82 may include a single controller or multiple control units in communication with each other. Each controller may include one or more processors that include (or are communicatively coupled to) memory having computer executable storage instructions which, when executed by the processor(s), cause the controller(s) to perform their programmed function. Controller 82 is also in communication with the ballast(s) or driver(s) of light fixtures 50.

Controller 82 is programmed to control the dimming of artificial light sources 60 in light fixtures 50 in response to fluctuation in the amount of total light sensed by photo sensor(s) 80 in order to maintain a desired illumination level in room 70. For example, natural light is supplied through light ducts 40 during the day but not during the night. Therefore, if a constant amount of artificial light were supplied from light fixtures 50, room 70 would receive more total light during the day than during the night. This would cause room 70 to be too dark at night and/or too bright during the day. Accordingly, when photo sensor 80 senses that the illumination level in room 70 is too high, controller 82 dims the artificial light sources 60 of light fixtures 50 in order to reach the desired illumination level. Conversely, when photo sensor 80 senses that the illumination level in room 70 is too low, controller 82 turns the artificial light sources 60 of light fixtures 50 up in order to brighten the room to reach the desired illumination level. It will be appreciated that the amount of natural light transmitted from curb 30 through light ducts 40 will fluctuate throughout the day based on such factors as the position of the sun as it goes from rising in the morning to setting in the evening, the time of year, and whether the sky is clear, cloudy, foggy, or hazy. In order to account for this fluctuation, controller 82 is programmed to continually monitor the illumination level sensed by photo sensor 80 and to continually adjust the brightness of artificial light sources 60.

Controller 82 may be programmed to adjust artificial light sources 60 collectively as a group. For example, if the example configuration shown in FIGS. 12 and 13 is used, controller 82 may be used to adjust the artificial light sources 60 of all nine light fixtures 50 jointly. Alternatively, controller 82 may be programmed to adjust the artificial light sources 60 of light fixtures 50 individually or in smaller groups. For example, if the configuration shown in FIGS. 12 and 13 is used, controller 82 may be programmed to adjust the artificial light sources 60 of each of the nine light fixtures 50 individually or in groups, such as adjusting the light fixtures 50 in sets of three. This is particularly useful where natural light is also provided to the room 70 via one or more windows because it allows the artificial lights 60 near the windows to be dimmed to a greater degree than the artificial lights 60 farther away from the windows. In this manner, lighting system 10 combines artificial light and natural light to provide a substantially uniform illumination level and distribution that dynamically adjusts to changes in the amount of natural light available. While FIGS. 12 and 13 show all of the light fixtures 50 installed within a single room 70, it will be appreciated that a single curb 30 may feed natural light to light fixtures 50 in multiple rooms. As discussed above, controller 82 may adjust these light fixtures 50 collectively, individually or in groups, such as on a room by room basis.

A user input device 84 is provided that is in communication with controller 82. User interface 84 may be provided physically with controller 82 or it may be spaced therefrom. User input device 84 is configured to receive an input from a user of the desired illumination level for all or one or more portions of the areas controlled by controller 82. For example, a uniform desired illumination level may be set for an entire building or it may be desired that some rooms or areas are brighter than others. The user input device 84 may include an "on" setting and an "off" setting similar to a conventional light switch. When the "on" setting is selected, controller 82 will maintain the desired illumination level. When the "off" setting is selected, controller 82 will turn off artificial light sources 60 leaving only the natural light from light ducts 40. Further, user input device 84 may include a programmable timer setting that allows the user to set lighting system 10 to default to the "on" setting during predetermined times of the day when the room or area is frequently occupied and to default to the "off" setting when it is anticipated that the room or area will be empty.

User input device 84 may include any conventional input means including, but not limited to, one or more buttons, dials, or levers, a mechanical or touch screen keypad, or a mouse for inputting user settings. User input device 84 may also include a display portion such as a graphical user interface or one or more LED indicator lights that display information such as the system settings to the user. User input device 84 may be employed on a building-wide basis to control the lighting for an entire building. For example, user input device 84 may be placed near the thermostat in a home or in a utility room in a commercial facility to control the building's lighting. Alternatively, user input device 84 may be used to provide local control of individual rooms or portions of a building by placing a user input device 84 on the wall like a light switch.

In one embodiment, an occupancy sensor 81 is provided in one or more rooms or areas. Occupancy sensor 81 is in communication with controller 82. Occupancy sensor 81 allows controller 82 to provide one illumination setting when the room or area is occupied another when it is vacant. The occupancy settings may be provided by the user at user input device 84.

With reference back to FIGS. 2 and 3, in one embodiment, conventional polarized glass 90 is positioned in the path of one or more of light ducts 40. Polarized glass 90 is connected to a voltage source 92. When no voltage is applied, polarized glass 90 is clear to permit the passage of light therethrough. As voltage is applied, polarized glass 90 frosts to block a portion of the light from passing through. By varying the applied voltage, it's possible to vary the opacity of polarized glass 90 from clear to dark or any shade in between. In one example embodiment, between 0 and 10 volts are provided from voltage source 92 to polarized glass 90. Voltage source 92 is in communication with controller 82. Controller 82 is programmed to adjust the voltage supplied to polarized glass 90 in order to achieve the desired illumination level set by the user. As a result, in this embodiment, as the amount of natural light entering room 70 through light ducts 40 fluctuates, controller 82 may be programmed to maintain the desired illumination level by dimming the artificial light sources, by increasing the opacity of polarized glass 90 to dim the natural light or both.

In the example embodiment illustrated, polarized glass 90 is positioned within curb 30 at the inlet 42 of light ducts 40; however, polarized glass 90 may be positioned at any other suitable point including at outlet 46 of light ducts 40 or at an intermediate point. One sheet of polarized glass 90 may be positioned over the inlets 42 of all of the light ducts 40 in a given curb 30. In this configuration, the natural light to each light fixture 50 can be uniformly dimmed or brightened by adjusting the voltage supplied to the sheet. Alternatively, multiple sheets of polarized glass 90 may be used in order to permit dimming/brightening of the natural light per each individual light fixture 50 or in groups of light fixtures 50. For example, in FIG. 3, two sheets of polarized glass 90a, 90b are provided. Sheet 90a covers six of the nine light ducts 40 and therefore permits dimming of the natural light to a corresponding six light fixtures 50. Sheet 90b covers the remaining three light ducts 40 and permits dimming of the natural light to three light fixtures 50.

In some instances, it may be desired to darken a room receiving combined natural and artificial during the daytime. For example, a teacher may wish to darken a classroom in order to show a film or a day care center may wish to darken a nursery for naptime. Accordingly, in one embodiment, user input device 84 includes a setting for darkening all or a portion of the light fixtures 50 in a room. When this setting is selected, controller 82 turns off the artificial light sources 60 in light fixtures 50 and increases the opacity of polarized glass 90 to block natural light from passing through light ducts 40 into light fixtures 50.

Figures 14, 15:
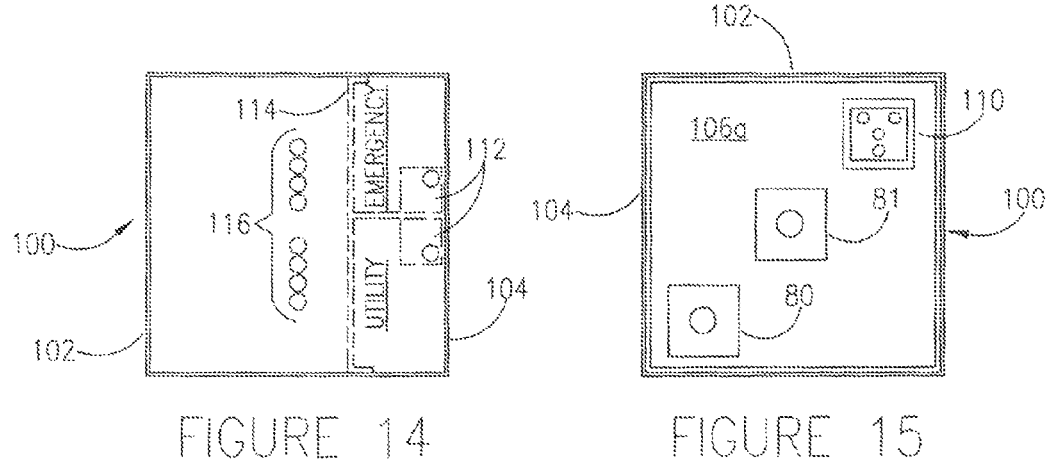
FIG. 14 is a top plan view of a control center for the lighting system according to one example embodiment.
FIG. 15 is a bottom view of the control center shown in FIG. 14.
Figure 16:
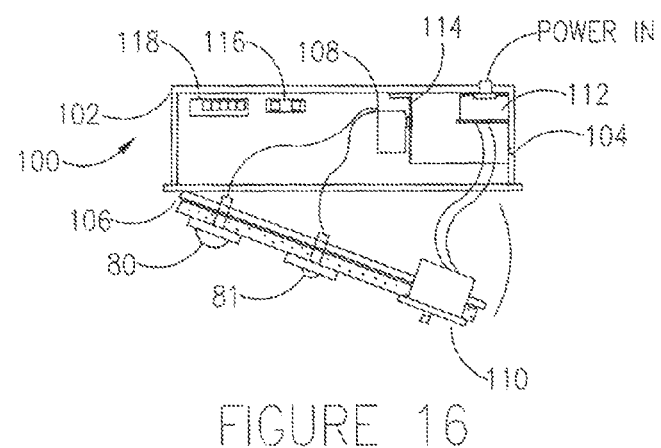
FIG. 16 is a side elevation of the control center shown in FIG. 14 with an access door partially opened.

With reference to FIGS. 14-16, a lighting control center 100 according to one example embodiment is shown. In this embodiment, the control components for lighting system 10 including photo sensor 80, occupancy sensor 81, controller 82 and voltage source 92 are prewired through control center 100 to provide a central access point for the respective control connections. In one embodiment, control center 100 includes a conventional electrical box 102 formed in the ceiling of the room or area being illuminated such as room 70 shown in FIG. 12. In one specific example embodiment, electrical box 102 is formed from a 22-gauge steel enclosure 104 having a hinged steel door 106 attached thereto. Where control center 100 is installed in the room or area being illuminated, an exterior face 106a of hinged door 106 may be tiled or otherwise covered to match the aesthetic appearance of the ceiling upon which it is installed. Photo sensor 80 and occupancy sensor 81 are each mounted on door 106 and wired to a transformer relay 108 positioned in electrical box 102. Control center 100 may also include an emergency bypass relay 110 for activating emergency lighting in the event of a power outage. Utility and emergency power are received in a junction box 112 that is insulated from the lower voltage components in electrical box 102 by barrier 114. A set of signal connections 116 is provided to make the desired connections between controller 82, voltage supply 92, the dimming ballasts, photo sensor 80 and occupancy sensor 81. Power is supplied to these components as needed through a corresponding bridge or power supply 118.

Figure 17:
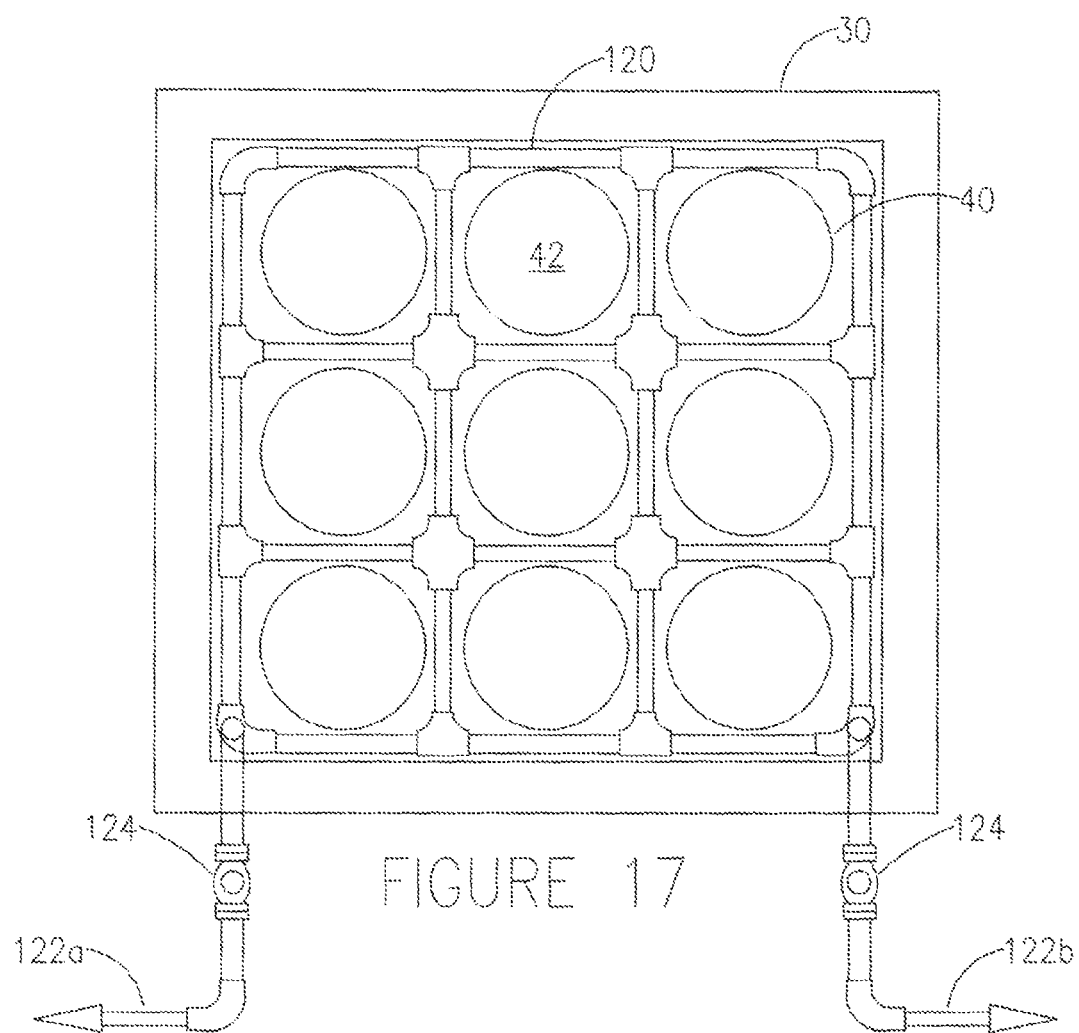
FIG. 17 is a top plan view of a curb having a water pipe system installed therein for recovering the heat captured by the curb according to one example embodiment.

With reference to FIG. 17, as discussed above, curb 30 collects a significant amount of heat from the natural light it receives. In the example embodiment illustrated, a water pipe system 120 runs through the interior of curb 30 outside of and above light ducts 40. The heat collected by curb 30 is transferred to water in water pipe system 120. As shown in FIG. 17, care must be taken to ensure that water pipe system 120 does not block the light entering curb 30 from reaching light ducts 40. As a result, in the example embodiment illustrated, water pipe system 120 is arranged in a grid formation around light ducts 40. In one specific embodiment, water pipe system 120 is comprised of 1" diameter black copper piping. Water pipe system 120 includes at least one inlet 122a that provides water to system 120 and at least one outlet 122b that permits removal of water from system 120 so that the heat collected by curb 30 may be captured thereby creating additional energy savings. A corresponding valve 124 is positioned at inlet 122a and/or outlet 122b to control the flow of water through water pipe system 120. Valve 124 opens to permit the domestic cold water of building 20 to fill water pipe system 120. Valve 124 may be thermostatically operated such that when the water reaches a predetermined temperature, valve 124 automatically opens to allow the water inside curb 30 to flow out of outlet 122b and to fill the pipes in curb 30 with new water to be heated. The heated water may then be fed into the building's water heater thereby reducing the amount by which the water in the water heater needs to be heated in order to supply hot water to building 20. The heated water may also be fed into the HVAC system of building 20 to be used as a heat source. In order to further enhance the energy savings, a photovoltaic cell may be provided on the exterior 22 of building 20, such as on the roof 26 adjacent to curb 30. The photovoltaic cell may then be used to power automated valves 124. If the domestic cold water does not provide sufficient pressure to move the water through water pipe system 120, a pump, which may also be powered by the photovoltaic cell, may be used to assist.

With reference back to FIG. 1, in an alternative embodiment, an air duct 130 is connected to curb 30 that permits removal of hot air from inside curb 30. Air duct 130 may pass through or into curb 30 or it may simply be connected at a wall 32 of curb 30. Air duct 130 may be used with or without water pipe system 120. During the winter months, the hot air taken from curb 30 may be transferred to a portion of the interior 22 of building 20 to provide additional heat therein. During the summer months, the hot air taken from curb 30 may simply be vented to an exterior portion of building 20 in order prevent excessive heat accumulation in building 20. The photovoltaic cell discussed above may also be provided in this embodiment to power a fan in fluid communication with air duct 130 that may be used to force the hot air from within curb 30 to its destination.

It will be appreciated that lighting system 10 may be used to achieve a substantially uniform illumination. Lighting system 10 provides both artificial and natural light and, as a result, offers health benefits and energy savings in comparison with lighting systems that utilize only artificial light. Further, by capturing the heat from curb 30 using water or forced air, solar energy is harnessed as a natural resource that can be used by building 30 to offset energy costs and create a "greener" facility.

The foregoing description of several embodiments has been presented for purposes of illustration. It is not intended to be exhaustive or to limit the application to the precise forms disclosed, and obviously many modifications and variations are possible in light of the above teaching. It is understood that the invention may be practiced in ways other than as specifically set forth herein without departing from the scope of the invention. It is intended that the scope of the application be defined by the claims appended hereto.

What is claimed is:

1. A system for lighting an interior of a building, comprising:
    a curb positioned on an exterior of the building for receiving natural light;
    a plurality of light ducts positioned within the curb and extending into the building interior, each light duct having an inlet for receiving the natural light entering the curb and a reflective inner surface for transferring the natural light;
    a plurality of light fixtures for illuminating a portion of the building interior, each light fixture connected to an outlet of at least one of the plurality of light ducts and having a lighting mount for operatively connecting a dimmable artificial light source thereto such that both natural light and artificial light are emitted from each light fixture to the portion of the building interior;
    a photo sensor positioned in the portion of the building interior being illuminated by the light fixtures for sensing an illumination level in the portion of the building interior being illuminated; and
    a controller in communication with the photo sensor and the light fixtures programmed to adjust the amount of light emitted by each artificial light source in response to fluctuation in the illumination level sensed in the portion of the building interior being illuminated resulting from changes in the natural light in order to maintain a desired illumination level in the portion of the building interior being illuminated.

2. The system of claim 1, further comprising a cover positioned on the curb, at least a portion of the cover being one of substantially transparent and substantially translucent to allow natural light to pass therethrough.

3. The system of claim 2, wherein the cover is prism shaped.

4. The system of claim 1, wherein the outlet of each light duct is positioned relative to its respective light fixture to distribute the natural light substantially evenly from the light fixture.

5. The system of claim 4, wherein at least one of the light fixtures has an inlet that is positioned at a first end of the light fixture and connected to the outlet of at least one of the plurality of light ducts, and the at least one light fixture includes an outlet at a bottom portion of said light fixture and a top portion having a sloped height that reduces from the first end of said light fixture to a second end of said light fixture opposite the first end to evenly distribute the natural light from the outlet of said light fixture.

6. The system of claim 1, wherein the curb is insulated to reduce the transfer of heat collected by the curb from the natural light through the interior of the building.

7. The system of claim 6, wherein an interior portion of the curb surrounding the light ducts is insulated to prevent condensation on the light ducts.

8. The system of claim 1, further comprising a user input device in communication with the controller for receiving an input from a user of the desired illumination level.

9. The system of claim 1, further comprising polarized glass positioned in the path of at least one of the light ducts connected to a voltage source, wherein the opacity of the polarized glass changes as the voltage supplied to the polarized glass by the voltage source changes to dim the natural light passed through said light duct.

10. The system of claim 9, wherein the controller is in communication with the voltage source and programmed to adjust the voltage supplied to the polarized glass to achieve the desired illumination level.

11. A system for lighting an interior of a building, comprising:
- at least one light duct having an inlet for receiving natural light and a reflective inner surface for transferring the natural light;
- polarized glass positioned in the path of the light duct;
- a voltage source connected to the polarized glass, wherein the opacity of the polarized glass changes as the voltage supplied to the polarized glass by the voltage source changes to dim the natural light passed through the light duct;
- a light fixture for illuminating a portion of the building interior, the light fixture connected to an outlet of the at least one light duct and having a lighting mount for operatively connecting at least one dimmable artificial light source thereto such that both natural light and artificial light are emitted from the light fixture to the portion of the building interior;
- a photo sensor positioned in the portion of the building interior being illuminated by the light fixture for sensing an illumination level in the portion of the building interior being illuminated; and
- a controller in communication with the photo sensor, the light fixture and the voltage source and being programmed to adjust at least one of: (1) the amount of light emitted by the at least one artificial light source and (2) the opacity of the polarized glass in response to fluctuation in the illumination level sensed in the portion of the building interior being illuminated in order to maintain a desired illumination level in the portion of the building interior being illuminated.

12. The system of claim 11, wherein the polarized glass is positioned at the inlet of the light duct.

13. The system of claim 11, further comprising a user input device in communication with the controller for receiving an input from a user of the desired illumination level.

14. The system of claim 13, wherein the user input includes a setting for darkening the portion of the building interior being illuminated and in response to a selection of the darkening setting, the controller is programmed to turn off the artificial light source and increase the opacity of the polarized glass to reduce the amount of natural light emitted from the light fixture.

* * * * *